(12) United States Patent
Kodera

(10) Patent No.: US 9,359,006 B2
(45) Date of Patent: Jun. 7, 2016

(54) ELECTRIC POWER STEERING SYSTEM

(71) Applicant: JTEKT CORPORATION, Osaka-shi, Osaka (JP)

(72) Inventor: Takashi Kodera, Okazaki (JP)

(73) Assignee: JTEKT CORPORATION, Osaka (JP)

( * ) Notice: Subject to any disclaimer, the term of this patent is extended or adjusted under 35 U.S.C. 154(b) by 10 days.

(21) Appl. No.: 14/463,965

(22) Filed: Aug. 20, 2014

(65) Prior Publication Data

US 2015/0066305 A1 Mar. 5, 2015

(30) Foreign Application Priority Data

Aug. 29, 2013 (JP) .................................. 2013-178486

(51) Int. Cl.
*B62D 5/04* (2006.01)

(52) U.S. Cl.
CPC .............. *B62D 5/0472* (2013.01); *B62D 5/049* (2013.01); *B62D 5/0463* (2013.01)

(58) Field of Classification Search
None
See application file for complete search history.

(56) References Cited

U.S. PATENT DOCUMENTS

| | | | | |
|---|---|---|---|---|
| 6,092,012 A * | 7/2000 | Shimizu | ................. | B62D 5/065 180/416 |
| 7,826,950 B2 * | 11/2010 | Tamaizumi | .......... | B62D 5/0463 180/443 |
| 8,116,945 B2 * | 2/2012 | Nozawa | ............... | B62D 5/0472 180/443 |
| 8,135,516 B2 * | 3/2012 | Benyo | .................. | B62D 5/0466 701/41 |
| 8,447,491 B2 * | 5/2013 | Templin | ................ | B60W 30/20 701/110 |
| 8,544,593 B2 * | 10/2013 | Uryu | .................... | B62D 5/0463 180/443 |
| 8,820,469 B2 * | 9/2014 | Sakaguchi | ........... | B62D 5/0472 180/402 |
| 2008/0033613 A1 | 2/2008 | Tamaizumi et al. | | |
| 2011/0232988 A1 | 9/2011 | Aoki et al. | | |
| 2012/0041645 A1 * | 2/2012 | Benyo | .................. | B62D 5/0466 701/42 |
| 2012/0101705 A1 * | 4/2012 | Templin | ................ | B60W 30/20 701/99 |
| 2015/0066306 A1 * | 3/2015 | Kodera | ................ | B62D 5/0466 701/43 |

FOREIGN PATENT DOCUMENTS

| | | |
|---|---|---|
| EP | 2184217 A2 | 5/2010 |
| JP | A-2006-131191 | 5/2006 |
| JP | A-2011-203091 | 10/2011 |
| WO | 2012133590 A1 | 10/2012 |

OTHER PUBLICATIONS

Jan. 29, 2015 Extended European Search Report issued in European Application No. 14181837.7.

* cited by examiner

*Primary Examiner* — Yonel Beaulieu
*Assistant Examiner* — Krishnan Ramesh
(74) *Attorney, Agent, or Firm* — Oliff PLC

(57) ABSTRACT

There is provided an reliable electric power steering system. The electric power steering system includes a torque sensor that outputs a detection signal corresponding to a steering torque, and a controller. The controller computes a detected steering torque value based on the detection signal, and a torque differential value, which is a first-order time differential value of the detected steering torque value. The controller computes a current command value by providing compensation to a basic current command value based on the detected steering torque value with the use of a compensation value based on the torque differential value. When the detected steering torque value is held for a predetermined period, the controller holds the torque differential value at a value computed before the detected steering torque value is held, during the period in which the detected steering torque value is held.

12 Claims, 8 Drawing Sheets

ELECTRIC POWER STEERING SYSTEM

INCORPORATION BY REFERENCE

The disclosure of Japanese Patent Application No. 2013-178486 filed on Aug. 29, 2013 including the specification, drawings, and abstract, is incorporated herein by reference in its entirety.

BACKGROUND OF THE INVENTION

1. Field of the Invention

The invention relates to an electric power steering system that assists a vehicle steering operation.

2. Description of the Related Art

There is an electric power steering system that assists a driver's steering operation by applying assist force generated by a motor to a steering mechanism of a vehicle. A conventional electric power steering system of this type is described in Japanese Patent Application Publication No. 2011-203091 (JP 2011-203091 A). The electric power steering system includes a torque sensor and a controller that controls driving of a motor. The torque sensor includes a Hall IC and a magnetic circuit that applies magnetic flux corresponding to steering torque applied by a driver to the Hall IC. In the electric power steering system, when the steering torque varies in response to a driver's steering operation, the magnetic flux applied from the magnetic circuit to the Hall IC of the torque sensor varies. Thus, a detection signal corresponding to the steering torque is output from the torque sensor. The controller computes the steering torque on the basis of the detection signal from the torque sensor, and computes an assist command value on the basis of the detected steering torque value. The controller applies assist force to the steering mechanism by controlling driving of the motor so as to cause the torque output from the motor to follow the assist command value.

The electric power steering system described in JP 2011-203091 A includes a magnetic field generator that periodically applies a magnetic field to the torque sensor, aside from the magnetic circuit. When a magnetic field is applied to the torque sensor through the use of the magnetic field generator, the controller determines whether a signal based on the applied magnetic field is output from the torque sensor. When the signal based on the applied magnetic field is not output from the torque sensor, the controller determines that a malfunction has occurred in the torque sensor. The controller detects the steering torque on the basis of the detection signal from the torque sensor immediately before the magnetic field is applied to the torque sensor from the magnetic field generator, and the controller holds the detected steering torque value during a period in which the magnetic field is generated from the magnetic field generator.

As described in, for example, Japanese Patent Application Publication No. 2006-131191 (JP 2006-131191 A), there is an electric power steering system that computes a first-order time differential value of a detected steering torque value on the basis of the detected steering torque value and provides compensation to an assist command value on the basis of the computed torque differential value.

In the electric power steering system described in JP 2011-203091 A, the detected steering torque value is constant during a period in which the detected steering torque value is held. When the controller computes the torque differential value in the period, the torque differential value is zero and the state where the torque differential value is zero continues. When the torque differential value is fixed to zero in this way, it is not possible to appropriately make compensation based on the torque differential value. In this regard, there is still room for improvement.

SUMMARY OF THE INVENTION

One object of the invention is to provide an electric power steering system that is able to ensure the reliability of a compensation system based on a torque differential value, even during a period in which a detected steering torque value is held at a constant value.

An electric power steering system according to an aspect of the invention includes:
- a motor that applies assist force to a steering mechanism of a vehicle;
- a torque sensor that outputs a detection signal corresponding to a steering torque applied to the steering mechanism; and
- a controller that controls driving of the motor.
The controller
- computes a detected steering torque value on the basis of the detection signal, and computes a torque differential value that is a first-order time differential value of the detected steering torque value, and
- controls driving of the motor on the basis of an assist command value computed by providing compensation to a basic assist command value based on the detected steering torque value with use of a compensation value based on at least the torque differential value.
When the detected steering torque value is held for a predetermined period, the controller holds the torque differential value at a value computed before the detected steering torque value is held, during the period in which the detected steering torque value is held.

With this configuration, during the period in which the detected steering torque value is held, the torque differential value is held at an actual value or a value close to the actual value. Thus, during the period in which the detected steering torque value is held, it is possible to avoid a situation where the detected steering torque value is constantly fixed to zero. It is therefore possible to further appropriately compute the compensation value based on the torque differential value. As a result, it is possible to ensure the reliability of a compensation system.

BRIEF DESCRIPTION OF THE DRAWINGS

The foregoing and further features and advantages of the invention will become apparent from the following description of example embodiments with reference to the accompanying drawings, wherein like numerals are used to represent like elements and wherein.

DETAILED DESCRIPTION OF EMBODIMENTS

Figure 1:
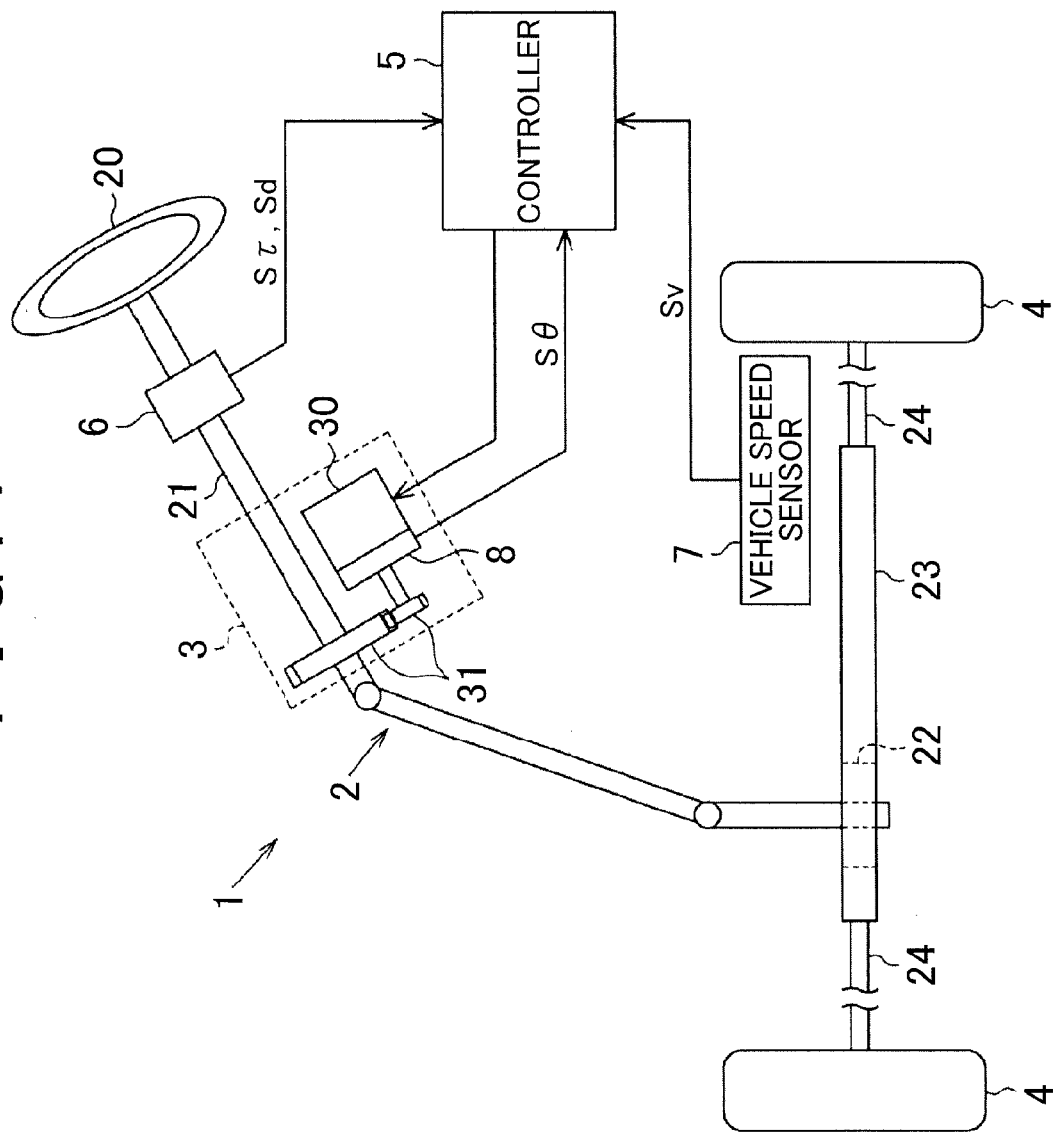
FIG. 1 is a block diagram illustrating the schematic configuration of an electric power steering system according to an embodiment of the invention.

Hereinafter, an electric power steering system 1 according to an embodiment of the invention will be described with reference to the accompanying drawings. As illustrated in FIG. 1, the electric power steering system 1 according to the present embodiment includes a steering mechanism 2 that steers steered wheels 4 in response to a driver's operation of a steering wheel 20, and an assist mechanism 3 that assists the driver's steering operation.

The steering mechanism 2 includes a steering shaft 21, which serves as a rotary shaft of the steering wheel 20, and a rack-and-pinion mechanism 22 disposed at the lower end of the steering shaft 21. The rack-and-pinion mechanism 22 includes a rack shaft 23. In the steering mechanism 2, when the steering shaft 21 rotates in response to the driver's operation of the steering wheel 20, the rotation of the steering shaft 21 is converted into a linear reciprocating motion of the rack shaft 23 in its axial direction by the rack-and-pinion mechanism 22. The linear reciprocating motion of the rack shaft 23 is transmitted to the steered wheels 4 via tie rods 24 connected to respective ends of the rack shaft 23. As a result, the steered angle of the steered wheel 4 is changed and thus the travelling direction of the vehicle is changed.

The assist mechanism 3 includes a motor 30 that applies assist force (assist torque) to the steering shaft 21. A brushless motor is used as the motor 30. The torque output from the motor 30 is transmitted to the steering shaft 21 via a speed reducer 31, so that the assist torque is applied to the steering shaft 21 to assist the steering operation.

The electric power steering system 1 is provided with various sensors that detect an operation amount of the steering wheel 20 and state quantities of the vehicle. For example, the steering shaft 21 is provided with a torque sensor 6. The torque sensor 6 detects a steering torque applied to the steering shaft 21 at the time of the driver's steering operation and outputs a voltage signal corresponding to the detected steering torque as a detection signal Sτ. When a supply of electric power to the torque sensor 6 is started, the torque sensor 6 outputs a malfunction diagnosis signal Sd based on which whether the torque sensor 6 is malfunctioning is determined, instead of the detection signal Sτ, just over a predetermined period.

The vehicle is provided with a vehicle speed sensor 7. The vehicle speed sensor 7 detects a travelling speed (vehicle speed) of the vehicle, and outputs a voltage signal corresponding to the detected vehicle speed as a detection signal Sv. The motor 30 is provided with a rotation angle sensor 8. The rotation angle sensor 8 detects a rotation angle of the motor 30, and outputs a voltage signal corresponding to the detected motor rotation angle as a detection signal Sθ. The signals output from the sensors 6 to 8 are input into a controller 5. The controller 5 controls driving of the motor 30 on the basis of the signals output from the sensors 6 to 8.

Figure 2:
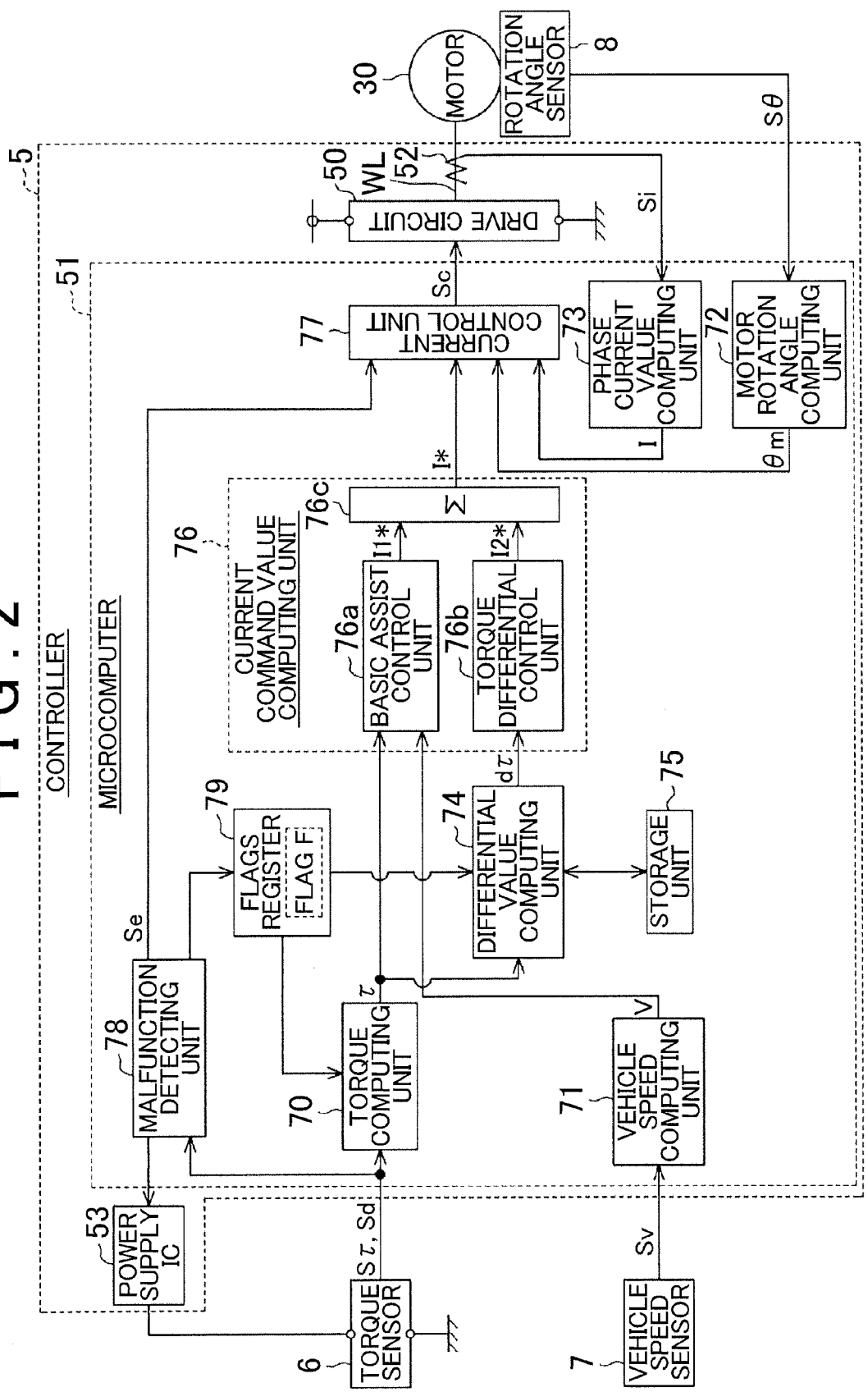
FIG. 2 is a block diagram illustrating the configuration of a controller of the electric power steering system according to the embodiment.

As illustrated in FIG. 2, the controller 5 includes a drive circuit 50 that supplies driving electric power to the motor 30, and a microcomputer 51 that controls driving of the motor 30 through the use of the drive circuit 50. The drive circuit 50 converts DC power from a power source into three-phase AC power on the basis of a control signal Sc from the microcomputer 51, and supplies the three-phase AC power to the motor 30 via three-phase power supply lines WL. A pulse width modulation (PWM) signal is used as the control signal Sc. Each of the three-phase power supply lines WL is provided with a current sensor 52. In FIG. 2, for the purpose of convenience of explanation, the three-phase power supply lines WL are collectively illustrated as one power supply line WL, and the three-phase current sensors 52 are collectively illustrated as one current sensor 52. The current sensors 52 detect three-phase current values, which are values of three-phase currents flowing through the power supply lines WL, and output voltage signals corresponding to the detected three-phase current values as detection signals Si to the microcomputer 51.

Various signals output from the sensors 6 to 8 and 52 are input into the microcomputer 51. The microcomputer 51 generates the control signal Sc on the basis of the various signals output from the sensors 6 to 8 and 52. The microcomputer 51 controls the drive circuit 50 through PWM by outputting the control signal Sc to the drive circuit 50, and thus drives the motor 30.

Next, the drive control on the motor 30, which is executed by the microcomputer 51, will be described in detail. The microcomputer 51 includes a plurality of computing units 70 to 73 that compute detected values of various state quantities on the basis of the detection signals output from the sensors 6 to 8 and 52. The torque computing unit 70 computes a detected steering torque value τ on the basis of the detection signal Sτ output from the torque sensor 6. The vehicle speed computing unit 71 computes a detected vehicle speed value V on the basis of the detection signal Sv output from the vehicle speed sensor 7. The motor rotation angle computing unit 72 computes a detected motor rotation angle value θm on the basis of the detection signal Sθ output from the rotation angle sensor 8. The phase current value computing unit 73 computes three-phase detected current values I on the basis of the detection signal Si output from the current sensor 52. The computation cycle time of each of the computing units 70 to 73 is set to a first computation cycle time T1 (for example, 400 microseconds (μsec)).

The microcomputer 51 includes a differential value computing unit 74 that computes a torque differential value dτ, which is a first-order time differential value of the detected steering torque value τ. The differential value computing unit 74 acquires the detected steering torque value τ computed by the torque computing unit 70 at every second computation cycle time T2. The second computation cycle time T2 (for example, 800 μsec) is twice as long as the first computation cycle time T1. The differential value computing unit 74 computes the torque differential value dτ according to Expression (1) at every second computation cycle time T2. In Expression (1), $τ_i$ represents a currently-acquired value of the detected steering torque value τ, and $τ_{i-1}$ represents an immediately-preceding acquired value of the detected steering torque value τ.

$$dτ_i = (τ_i - τ_{i-1})/T2 \qquad (1)$$

The differential value computing unit 74 sequentially stores the detected steering torque value τ acquired from the torque computing unit 70 in a storage unit 75 of the microcomputer 51, and reads the immediately-preceding acquired value $\tau_{i-1}$ of the detected steering torque value from the storage unit 75.

The detected steering torque value τ computed by the torque computing unit 70, the detected vehicle speed value V computed by the vehicle speed computing unit 71, and the torque differential value dτ computed by the differential value computing unit 74 are input into a current command value computing unit 76. The current command value computing unit 76 computes a current command value I* on the basis of the detected steering torque value τ, the detected vehicle speed value V, and the torque differential value dτ. The current command value I* is a target value of a current applied to the motor 30.

In the present embodiment, the current command value I* corresponds to an assist command value that is a target value of the torque output from the motor 30. The current command value computing unit 76 includes a basic assist control unit 76a that computes a basic current command value I1* on the basis of the detected steering torque value τ and the detected vehicle speed value V, and a torque differential control unit 76b that computes a compensation value I2* on the basis of the torque differential value dτ.

The basic assist control unit 76a has, for example, a three-dimensional map indicating a relationship among the detected steering torque value τ, the detected vehicle speed value V, and the basic current command value I1*. The basic assist control unit 76a computes the basic current command value I1* on the basis of the map. The basic current command value I1* is a basic component of the current command value I* for causing the motor 30 to generate an appropriate output torque corresponding to the detected steering torque value τ and the detected vehicle speed value V. The basic current command value I1* corresponds to a basic assist command value. The basic assist control unit 76a sets the absolute value of the basic current command value I1* to a larger value as the absolute value of the detected steering torque value τ is larger, or as the detected vehicle speed value V is lower. The basic assist control unit 76a outputs the computed basic current command value I1* to an adder 76c.

The torque differential control unit 76b computes the compensation value I2* on the basis of the torque differential value dτ. The torque differential control unit 76b has, for example, a two-dimensional map indicating a relationship between the torque differential value dτ and the compensation value I2*. The torque differential control unit 76b computes the compensation value I2* on the basis of the map. By providing compensation to the basic current command value I1* with the use of the compensation value I2*, it is possible to stabilize, for example, a control system or to suppress reverse input vibrations transmitted from the steered wheels 4 to the steering mechanism 2. The torque differential control unit 76b outputs the computed compensation value I2* to the adder 76c.

The adder 76c provides compensation to the basic current command value I1* by adding the compensation value I2* computed by the torque differential control unit 76b to the basic current command value I1* computed by the basic assist control unit 76a, and outputs the compensation computation result I1*+I2* as the current command value I*.

The current command value I* computed by the current command value computing unit 76, the detected motor rotation angle value θm computed by the motor rotation angle computing unit 72, and the detected three-phase current values I computed by the phase current value computing unit 73 are input into a current control unit 77. The current control unit 77 converts the detected three-phase current values I into a d-axis current value and a q-axis current value in a d/q coordinate system with the use of the detected motor rotation angle value θm. The current control unit 77 computes a d-axis voltage command value and a q-axis voltage command value by executing current feedback control for causing the d-axis current value and the q-axis current value to follow the current command value I*. The current control unit 77 converts the d-axis voltage command value and the q-axis voltage command value into three-phase voltage command values with the use of the detected motor rotation angle value θm. The current control unit 77 controls the drive circuit 50 through PWM by outputting the control signal Sc based on the three-phase voltage command values to the drive circuit 50. Thus, the driving electric power corresponding to the control signal Sc is supplied from the drive circuit 50 to the motor 30, and thus the drive control of the motor 30 is executed.

Next, the operation of the torque sensor 6 will be described in detail. The controller 5 includes a power supply IC 53 that supplies operating electric power to the torque sensor 6. The power supply IC 53 secures the operating electric power of the torque sensor 6 by adjusting the voltage that is supplied from the power supply such as an onboard battery to an operating voltage appropriate for the torque sensor 6 and applying the adjusted operating voltage to the torque sensor 6. The power supply IC 53 stops a supply of electric power to the torque sensor 6 and restarts the supply of electric power thereto in response to a command from the microcomputer 51. The torque sensor 6 operates as illustrated in FIG. 3 when the supply of electric power is started.

Figure 3:
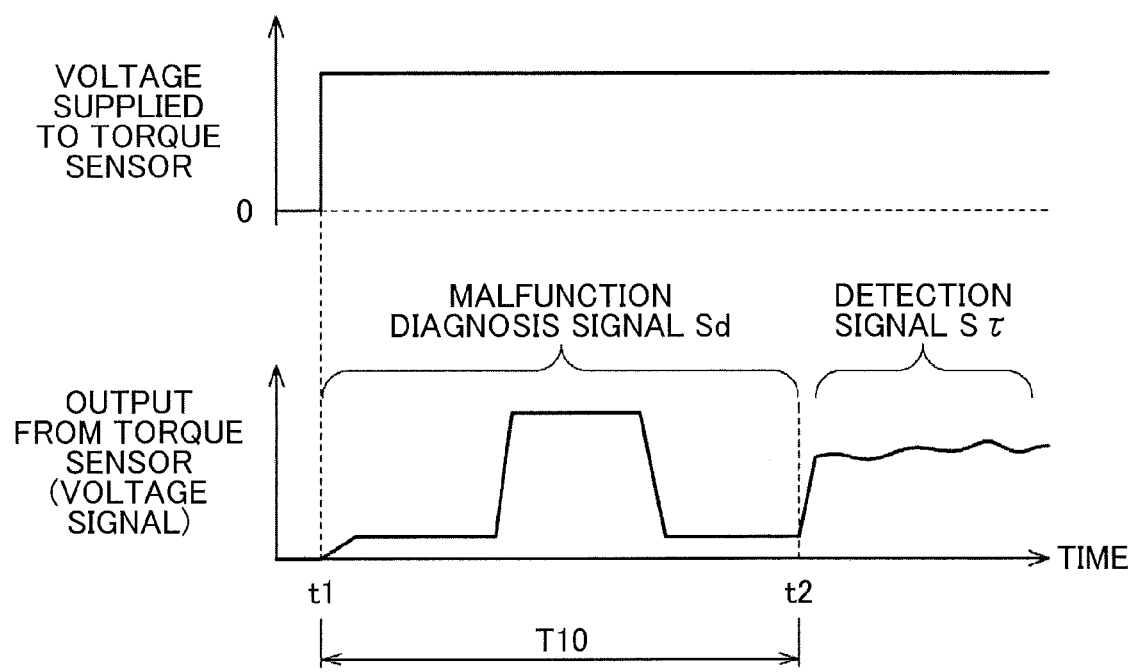
FIG. 3 is a timing chart illustrating transition in the voltage supplied to a torque sensor, and transition in an output from the torque sensor, in the electric power steering system according to the embodiment.

When the supply of electric power to the torque sensor 6 is started at time t1 as illustrated in FIG. 3, the torque sensor 6 first outputs a malfunction diagnosis signal Sd, which has a predetermined waveform and based on which whether the torque sensor 6 is malfunctioning is determined, just over a predetermined period T10. Then, the torque sensor 6 outputs the detection signal Sτ after time t2 at which the output of the malfunction diagnosis signal Sd is completed.

When some sort of malfunction occurs in the torque sensor 6, the torque sensor 6 outputs a malfunction diagnosis signal Sd having a waveform other than the predetermined waveform. Based on this malfunction diagnosis signal Sd, the microcomputer 51 detects occurrence of a malfunction in the torque sensor 6 on the basis of a change in the malfunction diagnosis signal Sd output from the torque sensor 6.

A method of detecting a malfunction of the torque sensor 6 with the use of the microcomputer 51 will be described below. As illustrated in FIG. 2, the microcomputer 51 includes a malfunction detecting unit 78 that detects a malfunction of the torque sensor 6. The malfunction detecting unit 78 causes the torque sensor 6 to periodically output the malfunction diagnosis signal Sd and the detection signal Sτ f by periodically executing stopping of the supply of electric power to the torque sensor 6 and restarting of the supply of electric power thereto through the use of the power supply IC 53. The malfunction detecting unit 78 detects a malfunction of the torque sensor 6 on the basis of the malfunction diagnosis signal Sd periodically output from the torque sensor 6.

Figure 4:
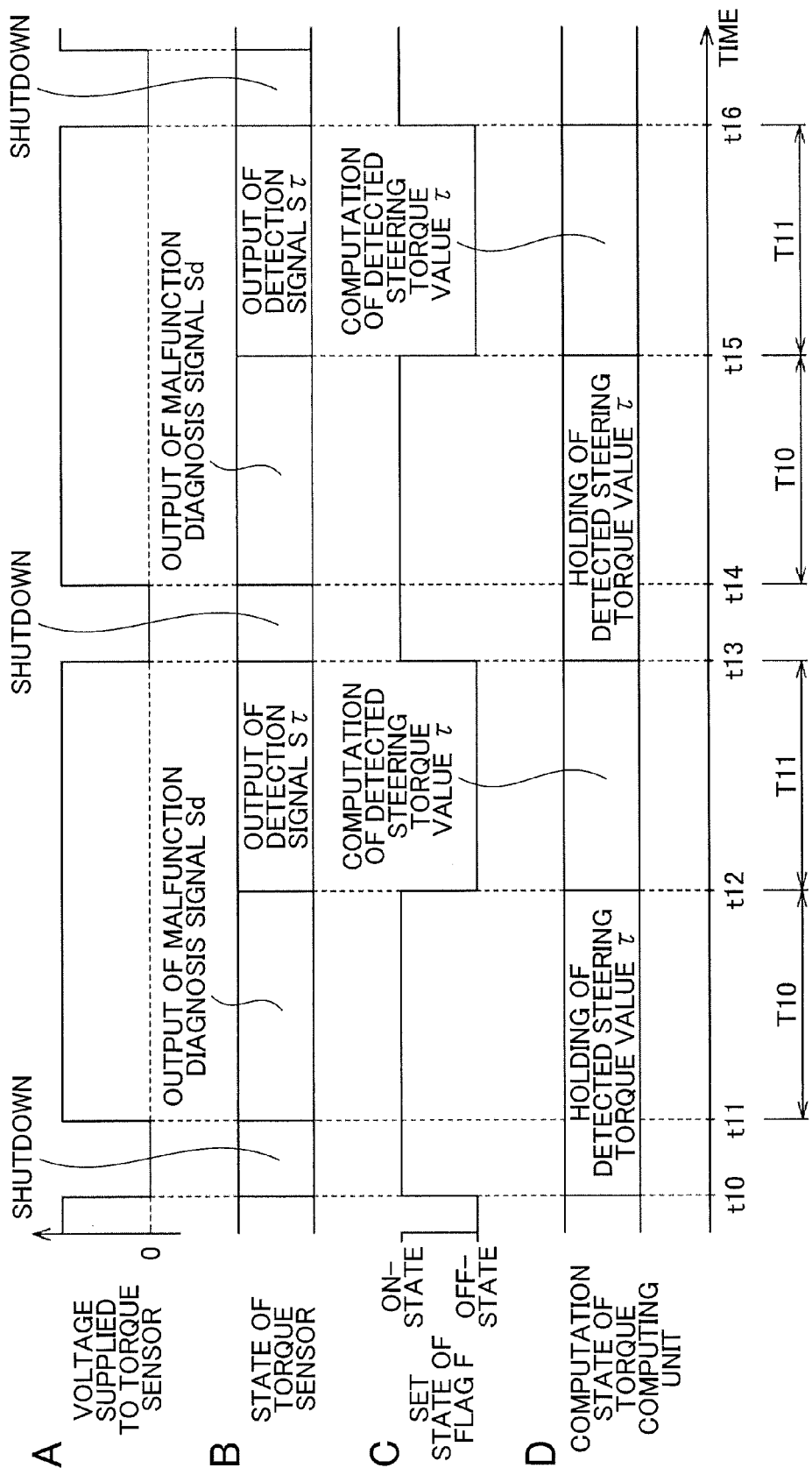
FIG. 4 is a timing chart illustrating graph A: transition in the voltage supplied to the torque sensor, graph B: transition in the state of the torque sensor, graph C: transition in the set state of a flag F, graph D: transition in the computation state of a torque computing unit, in the electric power steering system according to the embodiment.

As illustrated in graph A in FIG. 4, the malfunction detecting unit 78 temporarily stops the supply of electric power to the torque sensor 6, for example, at time t10, and then restarts the supply of electric power to the torque sensor 6 at time t11. Thus, as illustrated in graph B in FIG. 4, the torque sensor 6 is temporarily shut down and then starts output of the malfunction diagnosis signal Sd. The torque sensor 6 outputs the malfunction diagnosis signal Sd over a period from time t11 at which the supply of electric power is started until time t12 at which the predetermined period T10 has elapsed from time t11. At this time, the malfunction detecting unit 78 determines whether the malfunction diagnosis signal Sd output from the torque sensor 6 has a predetermined waveform. The malfunction detecting unit 78 determines that the torque sensor 6 is operating properly when the malfunction diagnosis signal Sd has the predetermined waveform, whereas determines that the torque sensor 6 is malfunctioning when the malfunction diagnosis signal Sd does not have the predetermined waveform.

When the torque sensor 6 is operating properly, as illustrated graph A and graph B in in FIG. 4, the malfunction detecting unit 78 continues supply of electric power to the torque sensor 6 from time t12 to time t13 at which a predetermined period T11 has elapsed from time t12, and thus the torque sensor 6 outputs the detection signal Sτ from time t12 to time t13. The malfunction detecting unit 78 stops the supply of electric power to the torque sensor 6 again at time t13 and then restarts the supply of electric power to the torque sensor 6 at time t14. Thus, the torque sensor 6 is shut down at time t13 and then outputs the malfunction diagnosis signal Sd again at time t14. At this time, the malfunction detecting unit 78 determines again whether the torque sensor 6 is malfunctioning on the basis of the malfunction diagnosis signal Sd output from the torque sensor 6. Then, the malfunction detecting unit 78 alternately causes the torque sensor 6 to output the malfunction diagnosis signal Sd and the detection signal Sτ by periodically executing stopping of the supply of electric power to the torque sensor 6 and restarting of the supply of electric power. The malfunction detecting unit 78 determines whether the torque sensor 6 is malfunctioning each time the torque sensor 6 outputs the malfunction diagnosis signal Sd.

When a malfunction of the torque sensor 6 is detected on the basis of the malfunction diagnosis signal Sd output from the torque sensor 6, the malfunction detecting unit 78 outputs a malfunction detection signal Se to the current control unit 77 as illustrated in FIG. 2. When the current control unit 77 receives the malfunction detection signal Se from the malfunction detecting unit 78, the current control unit 77 executes, for example, fail-safe control such as control of stopping the driving of the drive circuit 50 to secure the safety of the electric power steering system 1.

As illustrated in FIG. 2, the microcomputer 51 includes a FLAGS register 79. A flag F in the FLAGS register 79 is set in the first computation cycle time T1 by the malfunction detecting unit 78. As illustrated in graph C in FIG. 4, the malfunction detecting unit 78 sets the flag F to an on-state in a period from the time point at which the supply of electric power to the torque sensor 6 is stopped to the time point at which it is confirmed that the output of the detection signal Sτ from the torque sensor 6 is started. The malfunction detecting unit 78 sets the flag F to an off-state in a period during which the torque sensor 6 outputs the detection signal Sτ. The torque computing unit 70 computes and holds the detected steering torque value τ on the basis of the set state of the flag F.

Next, a method of computing the detected steering torque value τ with the use of the torque computing unit 70 will be described in detail. As illustrated in graph D in FIG. 4, the torque computing unit 70 computes the detected steering torque value τ on the basis of the detection signal Sτ from the torque sensor 6 when the flag F is in the off-state, whereas holds the immediately preceding value of the detected steering torque value τ as the detected steering torque value τ when the flag F is in the on-state. Thus, for example, during the period from time t13 at which the supply of electric power to the torque sensor 6 is stopped to time t15 at which the output of the detection signal Sτ from the torque sensor 6 is started, the detected steering torque value τ is held at the value computed immediately before time t13. Thus, the microcomputer 51 is able to continue drive control of the motor 30 in both the period in which the torque sensor 6 is shut down and the period in which the malfunction diagnosis signal Sd is output from the torque sensor 6.

Next, a method of computing the torque differential value dτ with the use of the differential value computing unit 74 will be described in detail. The differential value computing unit 74 acquires the set state of the flag F from the FLAGS register 79 at the same time as acquisition of the detected steering torque value τ computed by the torque computing unit 70, and stores the detected steering torque value τ and the set state of the flag F in the storage unit 75 in association with each other. Thus, the differential value computing unit 74 is able to determine whether the immediately-preceding acquired value $\tau_{i-1}$ is the hold value, for example, by checking the set state of the flag F associated with the immediately-preceding acquired value $\tau_{i-1}$ of the detected steering torque value. The differential value computing unit 74 computes the torque differential value dτ by repeatedly executing the procedure illustrated in FIG. 5 in the second computation cycle time T2 with the use of the information stored in the storage unit 75.

Figure 5:
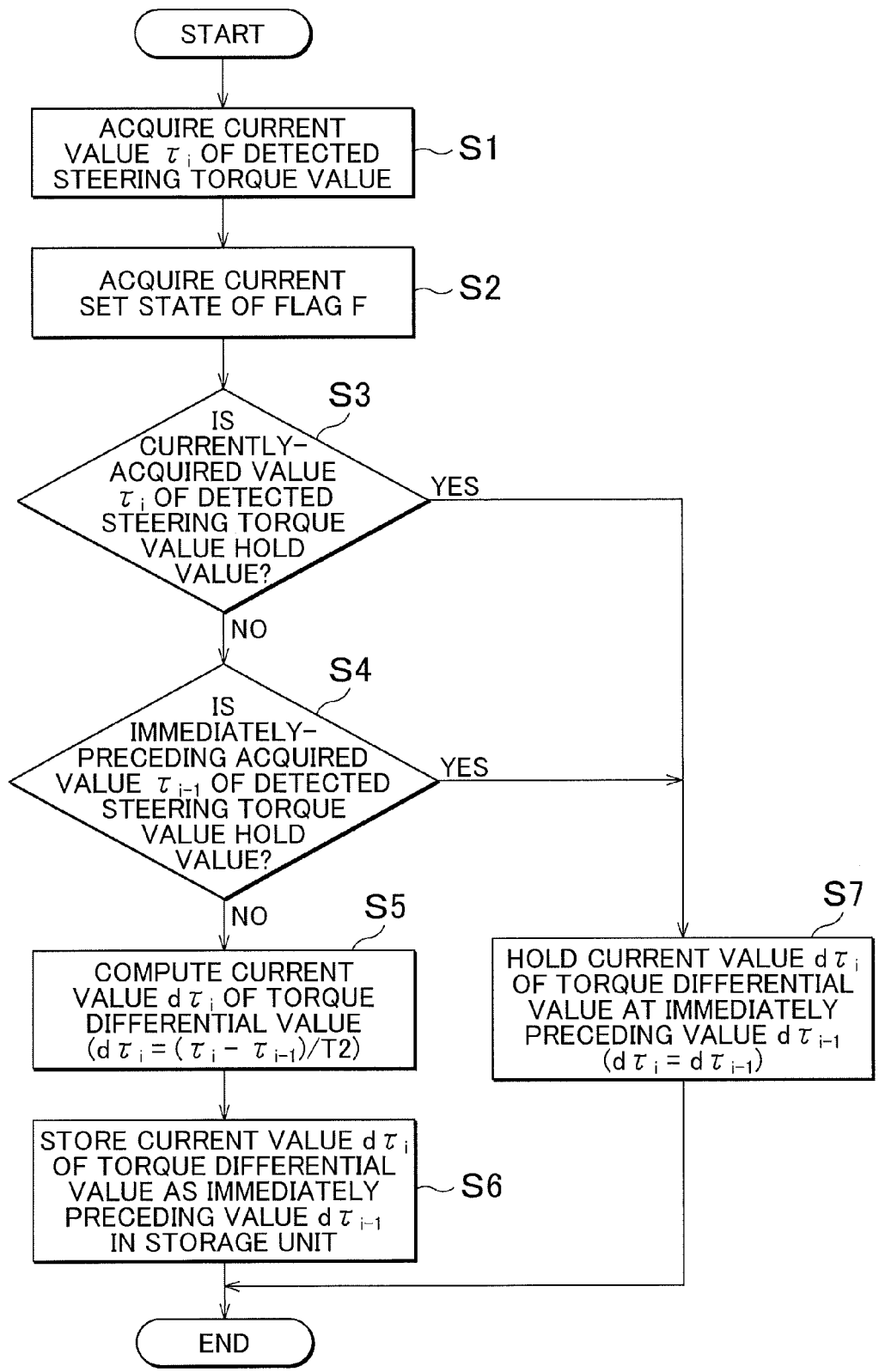
FIG. 5 is a flowchart illustrating the procedure for computing a torque differential value in the electric power steering system according to the embodiment.

As illustrated in FIG. 5, the differential value computing unit 74 first acquires the current value $\tau_i$ of the detected steering torque value (step S1), and acquires the current set state of the flag F (step S2). Then, the differential value computing unit 74 determines whether the currently-acquired value $\tau_i$ of the detected steering torque value is the hold value on the basis of the current set state of the flag F (step S3). When the currently-acquired value $\tau_i$ of the detected steering torque value is the hold value (YES in step S3), the differential value computing unit 74 holds the current value $d\tau_i$ of the torque differential value at the immediately preceding value $d\tau_{i-1}$ (step S7).

When the currently-acquired value $\tau_i$ of the detected steering torque value is not the hold value (NO in step S3), the differential value computing unit 74 determines whether the immediately-preceding acquired value $\tau_{i-1}$ of the detected steering torque value is the hold value on the basis of the immediately preceding set state of the flag F stored in the storage unit 75 (step S4). When the immediately-preceding acquired value $\tau_{i-1}$ of the detected steering torque value is the hold value (YES in step S4), the differential value computing unit 74 holds the current value $d\tau_i$ of the torque differential value at the immediately preceding value $d\tau_{i-1}$ (step S7).

On the other hand, when the immediately-preceding acquired value $\tau_{i-1}$ of the detected steering torque value is not the hold value (NO in step S4), the differential value computing unit 74 computes the current value $d\tau_i$ of the torque differential value according to Expression (1) (step S5). The differential value computing unit 74 stores the computed current value $d\tau_i$ of the torque differential value as the immediately preceding value $d\tau_{i-1}$ in the storage unit 75 (step S6).

The operation of the electric power steering system 1 according to the present embodiment will be described below with reference to FIG. 6. In graph B in FIG. 6, the detected steering torque value τ computed by the torque computing unit 70 is indicated by a filled circle, transition in the detected steering torque value τ is indicated by a solid line, the actual value of the steering torque is indicated by a filled triangle, and transition in the actual value of the steering torque is indicated by an alternate long and short dash line. In graph C in FIG. 6, the torque differential value dτ computed by the differential value computing unit 74 according to the present embodiment is indicated by a filled circle, transition in the torque differential value dτ is indicated by a solid line, the computation result when the torque differential value dτ is continuously computed according to Expression (1) is indicated by a filled triangle, and transition in the computation result is indicated by an alternate long and short dash line.

Figure 6:
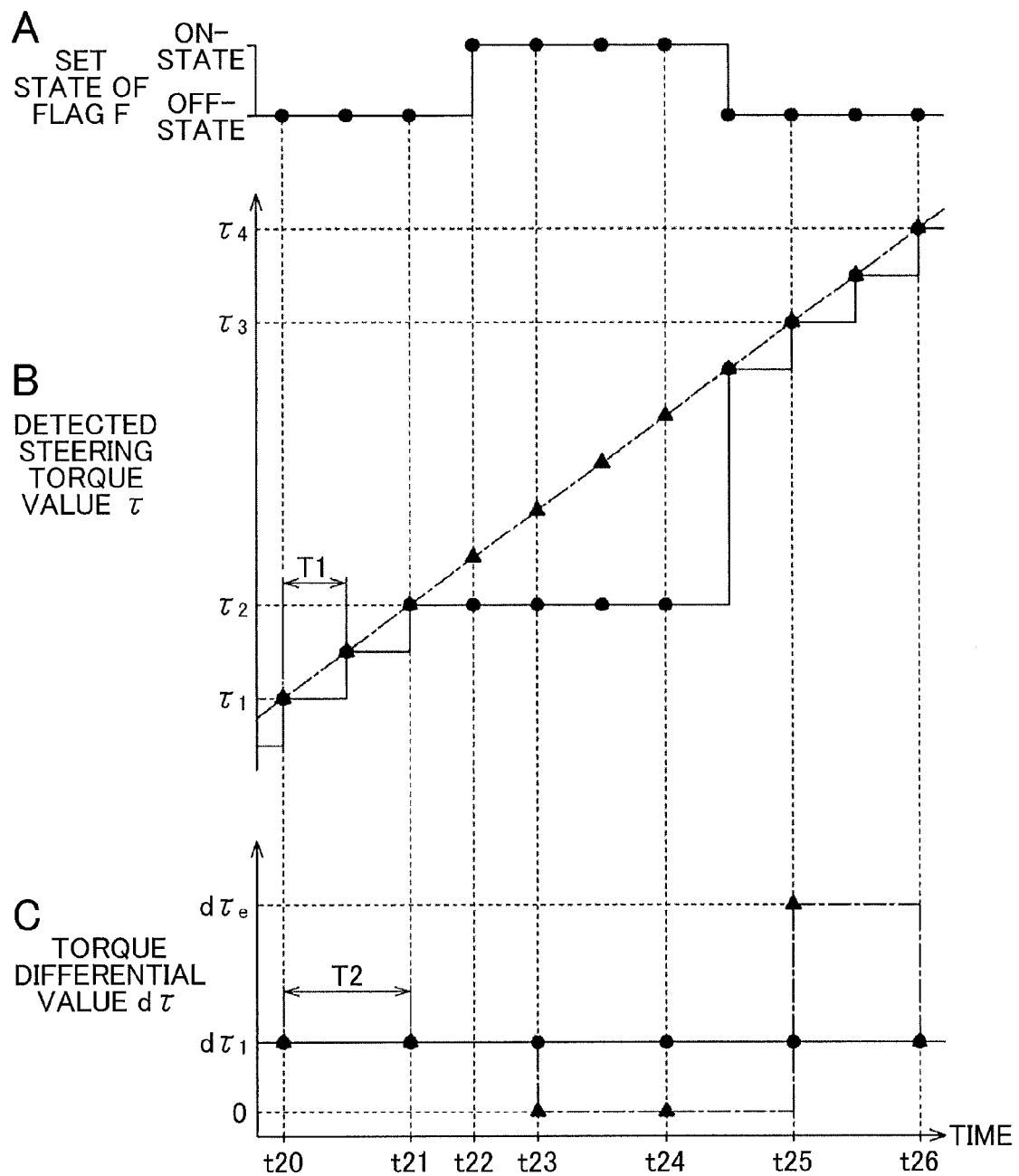
FIG. 6 is a timing chart illustrating graph A: transition in the set state of the flag F, graph B: transition in a detected steering torque value τ, graph C: transition in a torque differential value dτ, in the electric power steering system according to the embodiment.

The assumption is made that the flag F is set to the on-state during a period from time t22 to time t24, for example, as illustrated in graph A in FIG. 6, and the torque computing unit 70 holds the detected steering torque value τ during the period from time t22 to time t24 as illustrated in graph B in FIG. 6. Then, as illustrated in graph C in FIG. 6, the differential value computing unit 74 determines that neither a currently-acquired value $τ_2$ of the detected steering torque value nor the immediately-preceding acquired value $τ_1$ acquired at time t20 is the hold value on the basis of the set state of the flag F, at the time of computing the torque differential value dτ at time t21. Thus, the differential value computing unit 74 computes the current value $dτ_1$ of the torque differential value by dividing the difference value $(τ_2-τ_1)$ therebetween by the second computation cycle time T2 according to Expression (1).

Subsequently, the differential value computing unit 74 determines that the currently-acquired value $τ_2$ of the detected steering torque value is the hold value on the basis of the set state of the flag F, at the time of computing the torque differential value dτ at time t23. Thus, the differential value computing unit 74 uses the immediately preceding value $dτ_i$ of the torque differential value, as it is, as the current value. Similarly, the differential value computing unit 74 uses the immediately preceding value $dτ_1$ of the torque differential value, as it is, as the current value at time t24.

The differential value computing unit 74 determines that a currently-acquired value $τ_3$ of the detected steering torque value is not the hold value and the immediately-preceding acquired value $τ_2$ acquired at time t24 is the hold value on the basis of the set state of the flag F, at the time of computing the torque differential value dτ at time t25. Thus, the differential value computing unit 74 uses the immediately preceding value $dτ_1$ of the torque differential value, as it is, as the current value at time t25. This means that, when the held detected steering torque value is required to compute the torque differential value, the torque differential value dτ is held at the value computed immediately before the detected steering torque value τ is held.

The differential value computing unit 74 determines that neither a currently-acquired value $τ_4$ of the detected steering torque value nor the immediately-preceding acquired value $τ_3$ acquired at time t25 is the hold value on the basis of the set state of the flag F, at the time of computing the torque differential value dτ at time t26. Thus, the differential value computing unit 74 computes the current value dτ of the torque differential value by dividing the difference value $(τ_4-τ_3)$ therebetween by the second computation cycle time T2 according to Expression (1). In the example illustrated in FIG. 6, the current value dτ is equal to $dτ_1$.

With this configuration, as illustrated in graph C in FIG. 6, the torque differential value dτ is held at the actual value $dτ_1$ during the period from time t22 to time t24 in which the detected steering torque value τ is held. Thus, it is possible to avoid a situation where the torque differential value dτ is fixed to zero and is different from the actual value as indicated by the filled triangles in graph C in FIG. 6.

When the torque differential value dτ is continuously computed according to Expression (1), the torque differential value dτ is an abnormal value $dτ_e$ that greatly deviates from the actual value as indicated by the filled triangles in graph C in FIG. 6 in the situation at time t25, that is, the situation in which the currently-acquired value $τ_3$ of the detected steering torque value is not the hold value and the immediately-preceding acquired value $τ_2$ is the hold value. In this regard, in the present embodiment, the torque differential value dτ computed at time t25 is held at the actual value $τ_1$ or a value close to the actual value $τ_1$, and it is thus possible to prevent the torque differential value dτ from being an abnormal value.

As described above, in the electric power steering system 1 according to the present embodiment, the torque differential value dτ is held at the value $dτ_1$ computed at time t21 immediately before the detected steering torque value τ is held, during the period from time t22 to time t24 in which the detected steering torque value τ is held. Thus, the torque differential value dτ is held at the actual value or a value close to the actual value, and it is therefore possible to further appropriately compute the compensation value I2*. As a result, it is possible to ensure the reliability of a compensation system.

As described above, the following advantageous effects are obtained by the electric power steering system 1 according to the present embodiment.

1) The controller 5 holds the torque differential value dτ at the value computed immediately before the detected steering torque value τ is held, during the period in which the detected steering torque value τ is held. Specifically, when the currently-acquired value $τ_i$ of the detected steering torque value is the hold value, the torque differential value dτ is held at the value computed immediately before the detected steering torque value τ is held. Thus, the compensation value I2* is further appropriately computed, and it is therefore possible to ensure the reliability of the compensation system. Because the torque differential value dτ is held at the computed value closer to the actual value, it is possible to further accurately ensure the reliability of the compensation system.

2) The controller 5 holds the torque differential value dτ at the value computed immediately before the detected steering torque value τ is held, when the held detected steering torque value τ is required to compute the torque differential value dτ even during the period in which the detected steering torque value τ is not held. Specifically, when the currently-acquired value $τ_i$ of the detected steering torque value is not the hold value but the immediately-preceding acquired value $τ_{i-1}$ is the hold value, the torque differential value dτ is held at the value computed immediately before the detected steering torque value τ is held. Thus, the torque differential value dτ is prevented from being an abnormal value $τ_e$, and it is therefore possible to improve reliability of the compensation system.

3) The torque sensor 6 alternately outputs the detection signal Sτ and the malfunction diagnosis signal Sd. The controller 5 detects a malfunction of the torque sensor 6 on the basis of the malfunction diagnosis signal Sd. The controller 5 holds the detected steering torque value τ during the period in which the torque sensor 6 is shut down and the period in which the torque sensor 6 outputs the malfunction diagnosis signal Sd. Thus, the controller 5 is able to continue drive control of the motor 30 while monitoring whether a malfunction occurs in the torque sensor 6 during the period in which the torque sensor 6 is shut down and the period in which the malfunction diagnosis signal Sd is output from the torque sensor 6.

The above-described embodiment may be modified as follows. The set values of the first computation cycle time T1 and the second computation cycle time T2 may be changed as needed. In the above-described embodiment, the torque differential value dτ is held at the value computed immediately before the detected steering torque value τ is held. However, the torque differential value dτ may be held at any value computed before the detected steering torque value τ is held. For example, the torque differential value dτ may be held at a torque differential value computed at time t20 that is prior to time t21 indicated in graph C in FIG. 6.

Figure 7:
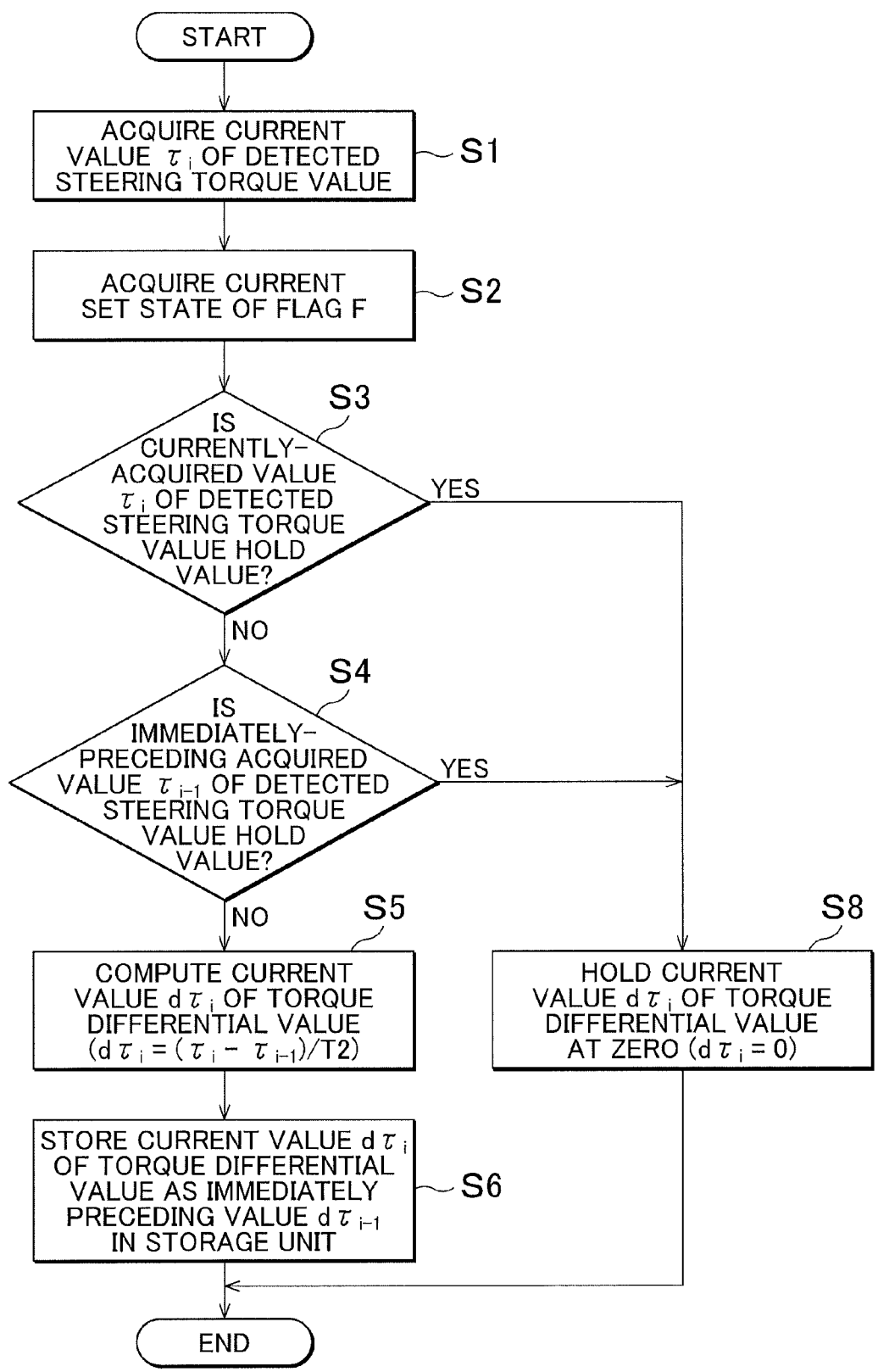
FIG. 7 is a flowchart illustrating the procedure for computing a torque differential value in an electric power steering system according to another embodiment of the invention.
Figure 8:
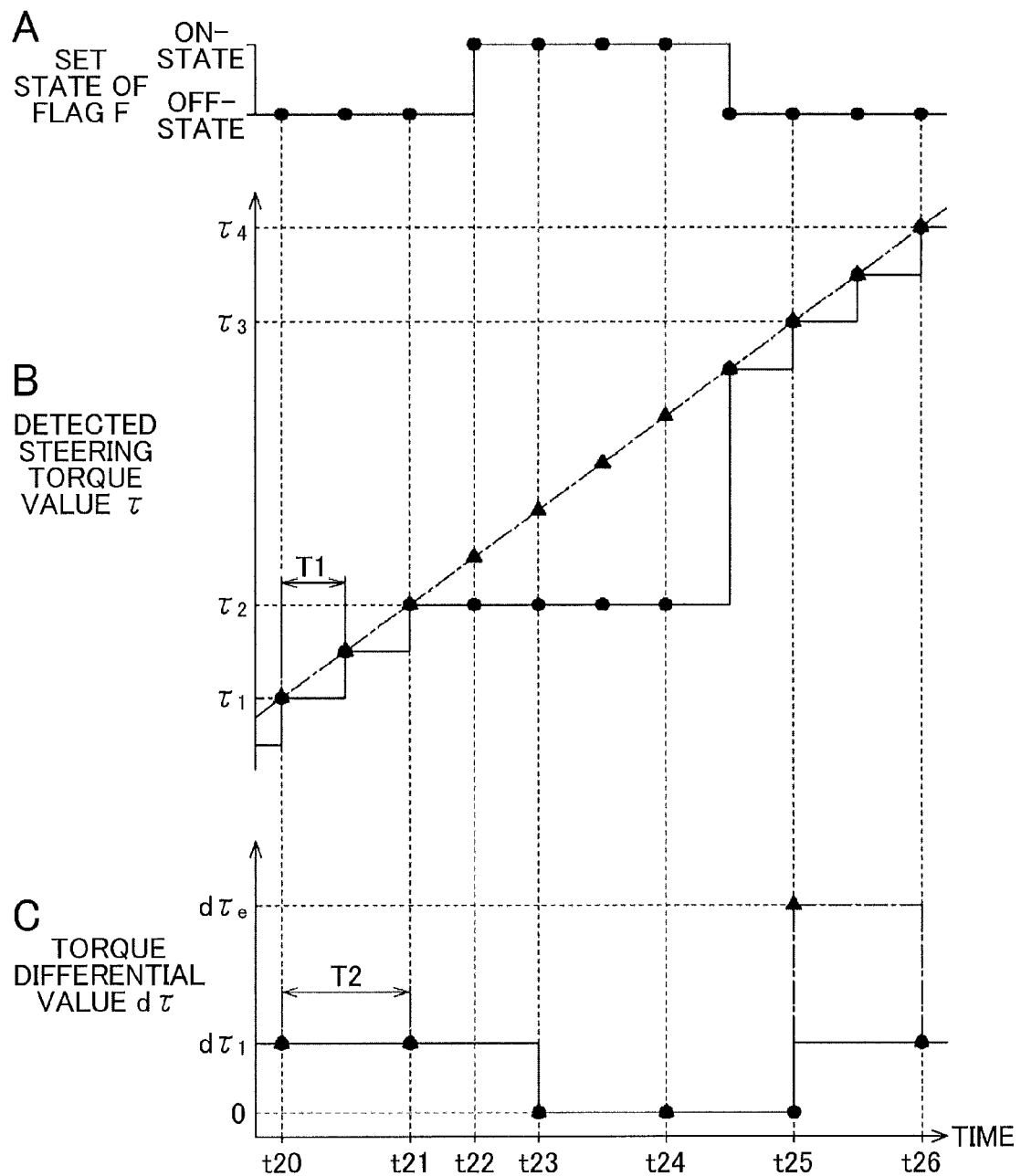
FIG. 8 is a timing chart illustrating graph A: transition in the set state of a flag F, graph B: transition in a detected steering torque value τ, graph C: transition in a torque differential value dτ, in the electric power steering system according to the other embodiment.

As illustrated in FIG. 7, when the currently-acquired value $τ_i$ of the detected steering torque value is the hold value (YES in step S3) or when the immediately-preceding acquired value $τ_{i-1}$ of the detected steering torque value is the hold value (YES in step S4), the current value $dτ_i$ of the torque differential value may be set to zero (step S8). With this configuration, as illustrated in FIG. 8, the torque differential value dτ is prevented from being an abnormal value $dτ_e$ at least at time t25. As a result, it is possible to ensure the reliability of the compensation system.

The process in step S4 may be omitted from the procedure illustrated in FIG. 5. That is, when the currently-acquired value $τ_i$ of the detected steering torque value is not the hold value (NO in step S3), the controller 5 may compute the current value $dτ_i$ of the torque differential value according to Expression (1) (step S5). With this configuration as well, it is at least possible to prevent the torque differential value dτ from being fixed to zero. Therefore, it is possible to improve the reliability of the compensation system.

In the above-described embodiment, the value immediately before the supply of electric power to the torque sensor 6 is stopped is used as the held detected steering torque value τ. However, any appropriate value may be used as long as the value is based on the detected steering torque value τ computed in the period in which the detection signal Sτ is output from the torque sensor 6. For example, the average value of the detected steering torque values τ in the period in which the detection signal Sτ is output may be used as the held detected steering torque value τ.

In the above-described embodiment, the torque sensor 6 spontaneously outputs the malfunction diagnosis signal Sd in response to the starting of the supply of electric power to the torque sensor 6. However, the configuration for causing the torque sensor 6 to output the malfunction diagnosis signal Sd may be changed as needed. For example, the torque sensor 6 may output the malfunction diagnosis signal Sd based on a command signal from the microcomputer 51. In this case, because it is not necessary to shut down the torque sensor 6, the detected steering torque value τ needs to be held only in the period in which the malfunction diagnosis signal Sd is output from the torque sensor 6. That is, the controller 5 needs to hold the detected steering torque value τ in at least the period in which the malfunction diagnosis signal Sd is output from the torque sensor 6.

In the above-described embodiment, the torque sensor 6 alternately outputs the malfunction diagnosis signal Sd and the detection signal Sτ. However, the torque sensor 6 may output only the detection signal Sτ in another embodiment. In this case, the controller 5 may detect a malfunction of a peripheral circuit for the torque sensor 6, for example, a malfunction of the power supply IC 53 that supplies the operating electric power to the torque sensor 6, as a malfunction of the torque sensor 6. In such an embodiment, the detected steering torque value τ may be held during the period in which the controller 5 determines whether the power supply IC 53 is malfunctioning.

In the above-described embodiment, the basic current command value I1* is set on the basis of the detected steering torque value τ and the detected vehicle speed value V. However, the basic current command value I1* may be set on the basis of only the detected steering torque value τ. The current command value computing unit 76 in the above-described embodiment uses only the compensation value I2* as the compensation component for the basic current command value I1*. However, another appropriate compensation component may be used.

In the above-described embodiment, the microcomputer 51 includes the torque computing unit 70. However, the torque sensor 6 may include the torque computing unit. In this case, the torque computing unit of the torque sensor 6 and the microcomputer 51 constitute the controller. When the torque sensor 6 includes the torque computing unit, the torque sensor 6 may be provided with a differential value computing unit. In this case, the torque computing unit and the differential value computing unit of the torque sensor 6 and the microcomputer 51 constitute the controller.

In the above-described embodiment, a brushless motor is used as the motor 30. However, a brushed motor may be used as the motor 30. The electric power steering system 1 according to the above-described embodiment is an electric power steering system that applies assist torque to the steering shaft 21. However, the invention may be applied to, for example, an electric power steering system that applies assist force to the rack shaft 23.

What is claimed is:

1. An electric power steering system comprising:
   a motor that applies assist force to a steering mechanism of a vehicle;
   a torque sensor that outputs a detection signal corresponding to a steering torque applied to the steering mechanism; and
   a controller configured to control driving of the motor, the controller being programmed to:
      compute a detected steering torque value on the basis of the detection signal,
      compute a torque differential value that is a first-order time differential value of the detected steering torque value,
      control driving of the motor on the basis of an assist command value computed by providing compensation to a basic assist command value based on the detected steering torque value with use of a compensation value based on at least the torque differential value, and
      in the case the detected steering torque value is held for a predetermined period, the controller holds the torque differential value at a hold value computed before the detected steering torque value is held, during the period in which the detected steering torque value is held.

2. The electric power steering system according to claim 1, wherein, during a period in which the detected steering torque value is not held, in the case the held detected steering torque value is required to compute the torque differential value, the controller holds the torque differential value at a value computed before the detected steering torque value is held.

3. The electric power steering system according to claim 2, wherein:
   the controller acquires the detected steering torque value in a predetermined cycle, and computes the torque differential value by dividing a difference value between a currently-acquired value of the detected steering torque value and an immediately-preceding acquired value of the detected steering torque value by the predetermined cycle time; and
   in the case the currently-acquired value of the detected steering torque value is the hold value, the controller holds the torque differential value at a value computed before the detected steering torque value is held.

4. The electric power steering system according to claim 3, wherein:
   the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal; and at least during a period in which the malfunction diagnosis signal is output from the torque sensor, the controller holds the detected steering torque value at a value computed in a period in which the detection signal is output.

5. The electric power steering system according to claim 2, wherein:

the controller acquires the detected steering torque value in a predetermined cycle, and computes the torque differential value by dividing a difference value between a currently-acquired value of the detected steering torque value and an immediately-preceding acquired value of the detected steering torque value by the predetermined cycle time; and in the case the currently-acquired value of the detected steering torque value is not the hold value and the immediately-preceding acquired value of the detected steering torque value is the hold value, the controller holds the torque differential value at a value computed before the detected steering torque value is held.

6. The electric power steering system according to claim 5, wherein:

the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal; and at least during a period in which the malfunction diagnosis signal is output from the torque sensor, the controller holds the detected steering torque value at a value computed in a period in which the detection signal is output.

7. The electric power steering system according to claim 2, wherein:

the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal; and at least during a period in which the malfunction diagnosis signal is output from the torque sensor, the controller holds the detected steering torque value at a value computed in a period in which the detection signal is output.

8. The electric power steering system according to claim 1, wherein:

the controller acquires the detected steering torque value in a predetermined cycle, and computes the torque differential value by dividing a difference value between a currently-acquired value of the detected steering torque value and an immediately-preceding acquired value of the detected steering torque value by the predetermined cycle time; and in the case the currently-acquired value of the detected steering torque value is the hold value, the controller holds the torque differential value at a value computed before the detected steering torque value is held.

9. The electric power steering system according to claim 8, wherein:

the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal; and at least during a period in which the malfunction diagnosis signal is output from the torque sensor, the controller holds the detected steering torque value at a value computed in a period in which the detection signal is output.

10. The electric power steering system according to claim 1, wherein the controller holds the torque differential value at a value computed immediately before the detected steering torque value is held.

11. The electric power steering system according to claim 10, wherein:

the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal; and at least during a period in which the malfunction diagnosis signal is output from the torque sensor, the controller holds the detected steering torque value at a value computed in a period in which the detection signal is output.

12. The electric power steering system according to claim 1, wherein:

the torque sensor alternately outputs a malfunction diagnosis signal and the detection signal, the malfunction diagnosis signal based on which whether the torque sensor is malfunctioning is determined;

the controller detects a malfunction of the torque sensor on the basis of the malfunction diagnosis signal;

and at least during a period in which the malfunction diagnosis signal is output from the torque sensor, the controller holds the detected steering torque value at a value computed in a period in which the detection signal is output.

* * * * *